(12) United States Patent
Maeda et al.

(10) Patent No.: US 12,480,875 B2
(45) Date of Patent: Nov. 25, 2025

(54) METHOD FOR SENSING PLANT HORMONE, AND METHOD FOR EARLY DETECTION OF DISEASE INFECTION IN PLANT USING SAME

(71) Applicant: NEC Corporation, Tokyo (JP)

(72) Inventors: Katsumi Maeda, Tokyo (JP); Shigeyūki Iwasa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 710 days.

(21) Appl. No.: 17/794,840

(22) PCT Filed: Jan. 25, 2021

(86) PCT No.: PCT/JP2021/002482
§ 371 (c)(1),
(2) Date: Jul. 22, 2022

(87) PCT Pub. No.: WO2021/153513
PCT Pub. Date: Aug. 5, 2021

(65) Prior Publication Data
US 2023/0096785 A1 Mar. 30, 2023

(30) Foreign Application Priority Data
Jan. 27, 2020 (JP) .................... 2020-010620

(51) Int. Cl.
*G01N 21/64* (2006.01)
*G01N 21/77* (2006.01)
*G01N 33/74* (2006.01)

(52) U.S. Cl.
CPC ............ *G01N 21/64* (2013.01); *G01N 21/77* (2013.01); *G01N 33/74* (2013.01); *G01N 2021/7786* (2013.01)

(58) Field of Classification Search
CPC ........ G01N 21/64; G01N 33/74; G01N 33/77; G01N 2033/415; G01N 2021/7786; G01N 21/77; Y10T 436/200833; Y10T 436/203332
USPC ............... 436/128, 131, 149, 164, 166, 172; 422/82.01, 82.02, 82.05, 82.08
See application file for complete search history.

(56) References Cited

U.S. PATENT DOCUMENTS

| | | | |
|---|---|---|---|
| 2018/0142277 A1 | 5/2018 | Ramasamy et al. | |
| 2020/0115730 A1* | 4/2020 | Ramasamy | G01N 27/3278 |
| 2023/0096759 A1* | 3/2023 | Maeda | G06T 7/70 382/110 |
| 2023/0236210 A1* | 7/2023 | Maeda | G01N 21/77 436/172 |
| 2023/0304931 A1* | 9/2023 | Maeda | G01N 31/00 |
| 2023/0384219 A1* | 11/2023 | Maeda | G01N 21/64 |
| 2024/0010912 A1* | 1/2024 | Maeda | G01N 21/6428 |
| 2024/0183779 A1* | 6/2024 | Maeda | G01N 27/48 |
| 2024/0327704 A1* | 10/2024 | Maeda | G01N 21/6428 |

FOREIGN PATENT DOCUMENTS

| | | |
|---|---|---|
| CN | 100493212 | 5/2009 |
| CN | 106124476 A | 11/2016 |
| JP | S59-087360 A | 5/1984 |
| JP | 2003-515613 A | 5/2003 |
| JP | 2004-279276 A | 10/2004 |
| JP | 2016-065868 A | 4/2016 |
| WO | 2018/122880 A1 | 7/2018 |
| WO | 2019/082942 A1 | 5/2019 |

OTHER PUBLICATIONS

JP Office Action for JP Application No. 2021-574029, mailed on Aug. 29, 2023 with English Translation.
Yi Feng et al., "Detection of methyl salicylate using bi-enzyriue electrochemical sensor consisting salicylate hydroxylase and tyrosinase", Biosensors and Bicelectronics, 2016, vol. 85, pp. 603-610.
Deepanjalee Dutta et al.," Phyenylboronic Acid Templated Gold Nanoclusters for Mucin Detection Using a Smartphone-Based Device and Targeted Cancer Cell Theranostics", ACS Appl. Mater. Interfaces, 2018, vol. 10 No.4, pp. 3210-3218.
International Search Report for PCT Application No. PCT/JP2021/002482, mailed on Apr. 6, 2021.
Satoko Hosokawa, "Communication between plants via odor", J. Japan Association on Odor Environment. vol. 36, No. 3, pp. 153-155, 2005.
Li, Y. et al., "A reagent-assisted method in SERS detection of methyl salicylate", Spectrochimica Acta Part A: Molecular and Biomolecular Spectroscopy, Jan. 31, 2018, vol. 195, pp. 172-175.

* cited by examiner

*Primary Examiner* — Maureen Wallenhorst
(74) *Attorney, Agent, or Firm* — Sughrue Mion, PLLC (57) ABSTRACT

Disease infection in a plant can be detected at an early stage by utilizing a boron-oxygen compound having a specific structure that selectively recognizes and forms a complex with methyl salicylate, which is a plant hormone released when a plant is infected by a pathogen, as a receptor for sensing, and by utilizing a fluorescence emission phenomenon and a change in electrochemical behavior after the reaction with methyl salicylate.

15 Claims, 6 Drawing Sheets

FIG.10 Fluorescence spectrum of TBO/MSA mixed solution

FIG.11 Relationship between MSA ratio and fluorescence intensity

METHOD FOR SENSING PLANT HORMONE, AND METHOD FOR EARLY DETECTION OF DISEASE INFECTION IN PLANT USING SAME

This application is a National Stage Entry of PCT/JP2021/002482 filed on Jan. 25, 2021, which claims priority from Japanese Patent Application 2020-010620 filed on Jan. 27, 2020, the contents of all of which are incorporated herein by reference, in their entirety.

TECHNICAL FIELD

The present invention relates to a method for sensing a plant hormone released when a plant is infected with a disease, and a method for early detection of disease infection in a plant.

BACKGROUND ART

It is known that plants have their own defense mechanisms that work against infection by pathogens such as filamentous fungi, feeding damage by insect pests and others, and stress due to environmental changes. Specifically, when plants are infected by pathogens, they synthesize salicylic acid, a signal substance, at the site of infection. Then, salicylic acid moves through the plant body via the sieve tube tissue and induces defense mechanisms in uninfected tissues, resulting in the development of systemic resistance to pathogens (systemic acquired resistance). Also, when plants undergo feeding damage by insect pests, they synthesize ethylene and jasmonic acid, which, in the same manner as salicylic acid, move through the plant body and induce defense mechanisms systemically (induced systemic resistance). Furthermore, it is known that plants adapt to environmental stress by synthesizing abscisic acid in the plant body in response to changes in the growth environment, such as drought, low temperature, and salt damage.

It is also known that, when plants are infected by pathogens or undergo feeding damage by insect pests, they have a mechanism to inform not only the damaged plants themselves but also the surrounding plants (Non-Patent Document 1). Specifically, salicylic acid, which is synthesized when infected by pathogens, is methylated to be methyl salicylate, which is released from the plants as a volatile signal substance to inform the surrounding plants of the pathogen infection, thus promoting defense mechanisms in advance. Jasmonic acid, which is synthesized at the time of damage by insect pests, is also known to be methylated to be methyl jasmonate, which is a volatile signal released from the plants, inducing resistance in the surrounding plants in advance.

As described above, it is known that plants release plant hormones as signal substances when they are damaged by diseases and insect pests, and sensing such signal substances as quickly as possible makes possible early detection of damage by diseases and insect pests.

As the method for early discovery of damage by sensing jasmonic acid released as a volatile signal at the time of insect pest damage, a method is disclosed in which a monitor plant with a luminescent protein gene is cultivated alongside a cultivated crop, and a phenomenon is utilized in which the monitor plant senses methyl jasmonate released and emits light when the crop undergoes damage by insect pests (Patent Document 1).

CITATION LIST

Patent Document

Patent Document 1: International Publication No. WO2019/082942

Non-Patent Document

Non-Patent Document 1: J. Japan Association on Odor Environment, Vol. 36, No. 3, 153-155(2005).

SUMMARY OF INVENTION

Technical Problem

An object of the present invention is to provide a method for sensing methyl salicylate, which is a plant hormone released when a plant is infected with a disease, in the cultivation of plants including crops, as well as such a sensor, thereby providing a method for early, in-situ detection of disease infection in a plant.

Solution to Problem

The present invention utilizes a compound having a specific structure that comprises a boron-oxygen bond that selectively recognizes and forms a complex with methyl salicylate, which is a volatile plant hormone, as a receptor for sensing. Also, the present invention detects disease infection in a plant at an early stage by utilizing a fluorescence emission phenomenon of a complex produced by a reaction of methyl salicylate and a compound having a specific structure that comprises a boron-oxygen bond. Furthermore, the present invention detects disease infection in a plant at an early stage by utilizing a phenomenon in which electrochemical behavior is changed by a reaction of methyl salicylate and a compound having a specific structure that comprises a boron-oxygen bond.

Advantageous Effect of Invention

By using a compound of the present invention having a specific structure that comprises a boron-oxygen bond, methyl salicylate, a volatile plant hormone released when a plant is infected by a pathogen, can be selectively sensed, and furthermore, infection in a plant by a pathogen can be detected at an early stage by utilizing a fluorescence emission phenomenon from a complex formed by a reaction of methyl salicylate and a compound having a specific structure that comprises a boron-oxygen bond, or by utilizing a change in electrochemical behavior.

BRIEF DESCRIPTION OF DRAWINGS

FIGS. 1(a) and (b) are photographs showing the results of confirming whether or not fluorescence emission is observed by exposing to UV lamp light a filter paper on which (a) tetraacetoxy diboroxane (TBO) alone and (b) tetraacetoxy diboroxane+methyl salicylate have been dropped, respectively.

FIGS. 2(a) and (b) are photographs showing the results of confirming whether or not fluorescence emission is observed by exposing to UV lamp light a filter paper on which (a) tetraacetoxy diboroxane (TBO) alone and (b) tetraacetoxy diboroxane+methyl jasmonate have been dropped, respectively.

FIGS. 4(a) and (b) are photographs showing the results of confirming whether or not fluorescence emission is observed by exposing to UV lamp light a filter paper on which (a) phenylboronic acid (PB) alone and (b) phenylboronic acid+ methyl salicylate have been dropped, respectively.

FIGS. 5(a) and (b) are photographs showing the results of confirming whether or not fluorescence emission is observed by exposing to UV lamp light a filter paper on which (a) phenylboronic acid (PB) alone and (b) phenylboronic acid+ methyl jasmonate have been dropped, respectively.

FIGS. 6(a) and (b) are photographs showing the results of confirming whether or not fluorescence emission is observed by exposing to UV lamp light a filter paper on which (a) 2,4,6-triphenylboroxine (TPB) alone and (b) 2,4,6-triphenylboroxine+methyl salicylate have been dropped, respectively.

FIGS. 7(a) and (b) are photographs showing the results of confirming whether or not fluorescence emission is observed by exposing to UV lamp light a filter paper on which (a) 2,4,6-triphenylboroxine (TPB) alone and (b) 2,4,6-triphenylboroxine+methyl jasmonate have been dropped, respectively.

FIGS. 8(a) and (b) are photographs showing the results of confirming whether or not fluorescence emission is observed by exposing to UV lamp light a filter paper on which (a) 2,4,6-tris(3,4,5-trifluorophenyl)boroxine (TFPB) alone and (b) 2,4,6-tris(3,4,5-trifluorophenyl)boroxine+methyl salicylate have been dropped, respectively.

FIGS. 9(a) and (b) are photographs showing the results of confirming whether or not fluorescence emission is observed by exposing to UV lamp light a filter paper on which (a) 2,4,6-tris(3,4,5-trifluorophenyl)boroxine (TFPB) alone and (b) 2,4,6-tris(3,4,5-trifluorophenyl)boroxine+methyl jasmonate have been dropped, respectively.

DESCRIPTION OF EMBODIMENTS

Hereinafter, embodiments of the present invention will be described with reference to the accompanying drawings and others. However, while the embodiments mentioned below have technically preferred limitations for implementing the present invention, they are not intended to limit the scope of the invention to those described below.

The present inventors have conducted diligent studies in order to solve the above-mentioned problem. As a result, they have found that methyl salicylate, which is a volatile signal substance released when a plant is infected by a pathogen, can be selectively sensed by using a compound having a specific structure that comprises a boron-oxygen bond, thus completing the present invention.

Hereinafter, embodiments according to the present invention will be described in detail.

<Receptor for Methyl Salicylate: Compound with Specific Structure that has Boron-Oxygen Bond>

Examples of the compound having a specific structure that comprises a boron-oxygen bond include a boron-oxygen compound having a structure represented by general formula (1):

Specifically, examples of the compound include a diboroxane derivative represented by the following general formula (2):

wherein R represents methyl group, ethyl group, propyl group, butyl group, or phenyl group, and each R may be the same as or different from each other;

a phenylboronic acid derivative represented by the following general formula (3):

wherein X represents hydrogen atom, alkyl group, alkoxy group, mercapto group, mercapto-substituted alkyl group, or mercapto-substituted alkoxy group, each having 1 to 4 carbon atoms, n represents an integer of 1 to 5, and when n is 2 or more, each X may be the same as or different from each other; and a boroxine derivative represented by the following general formula (4):

(4)

wherein Z represents alkyl group having 1 to 4 carbon atoms, or substituted or unsubstituted phenyl group. Here, each Z may be the same as or different from each other. Note that examples of the substituted phenyl group include alkyl-substituted phenyl group, alkoxy-substituted phenyl group, hydroxy-substituted phenyl group, halogen-substituted phenyl group (for example, fluorine-substituted phenyl group), halogenated alkyl-substituted phenyl group, amino-substituted phenyl group, nitro-substituted phenyl group, and carboxy-substituted phenyl group.)

For example, the above diboroxane derivative can selectively recognize methyl salicylate by forming a boron complex with methyl salicylate by a reaction shown in formula (1) below.

Formula (1)

The above phenylboronic acid derivative and boroxine derivative can also selectively recognize methyl salicylate by reacting with methyl salicylate to form complexes.

Thus, some embodiments of the present invention relate to a method for detecting methyl salicylate, comprising a step of allowing a boron-oxygen compound having a structure represented by general formula (1), a diboroxane derivative represented by general formula (2), a phenylboronic acid derivative represented by general formula (3), or a boroxine derivative represented by general formula (4) to react with methyl salicylate to form a complex.

Some embodiments of the present invention relate to a method for sensing methyl salicylate, using a boron-oxygen compound having a structure represented by general formula (1), a diboroxane derivative represented by general formula (2), a phenylboronic acid derivative represented by general formula (3), or a boroxine derivative represented by general formula (4) as a receptor that selectively recognizes methyl salicylate.

In some embodiments, tetraacetoxy diboroxane (TBO) may be used as the diboroxane derivative represented by general formula (2). In some embodiments, phenylboronic acid (PB) may be used as the phenylboronic acid derivative represented by general formula (3). In some embodiments, 2,4,6-triphenylboroxine acid (TPB) or 2,4,6-tris(3,4,5-trifluorophenyl)boroxine (TFPB) may be used as the boroxine derivative represented by general formula (4).

In some embodiments, the reaction of the boron-oxygen compound having a structure represented by general formula (1) and methyl salicylate is carried out in a solution. The solution may be, but is not limited to, an acetonitrile solution or a methanol solution, for example. In some embodiments, the concentration of the boron-oxygen compound having a structure represented by general formula (1) may be, for example, in the range of 0.00001 mol/L to 5 mol/L, such as in the range of 0.00004 mol/L to 0.4 mol/L.

In some embodiments, the reaction of the boron-oxygen compound having a structure represented by general formula (1) and methyl salicylate is carried out in a solid medium containing the boron-oxygen compound. The solid medium may be, but is not limited to, paper or resin (for example, polymethyl methacrylate, polyethylene, polypropylene, polyvinyl chloride, polystyrene, nylon resin, polyamide, polycarbonate, polyethylene terephthalate, polybutylene terephthalate, polyphenylene oxide, polyvinyl alcohol, and the like), for example.

<Fluorescence Emission Phenomenon>

The complex produced by the reaction of the compound having a specific structure that comprises a boron-oxygen bond and methyl salicylate newly exhibits fluorescence emission. Specifically, the complex formed by the reaction of the compound having a specific structure that comprises a boron-oxygen bond and methyl salicylate exhibits fluorescence emission by exposing it to excitation light with a wavelength of 200 to 400 nm. On the other hand, the compound having a specific structure that comprises a boron-oxygen bond alone does not exhibit fluorescence emission, which makes it possible to detect methyl salicylate.

Thus, some embodiments of the present invention relate to a method for detecting methyl salicylate, comprising: (i) a step of allowing a boron-oxygen compound having a structure represented by general formula (1), a diboroxane derivative represented by general formula (2), a phenylboronic acid derivative represented by general formula (3), or a boroxine derivative represented by general formula (4) to react with methyl salicylate to form a complex; (ii) a step of exposing the complex to excitation light; and (iii) a step of detecting fluorescence emitted by the complex. In some embodiments, an appropriate wavelength in the range of 200 to 400 nm is selected as the excitation wavelength. Furthermore, in some embodiments, a step of comparing the intensity of the detected fluorescence with a predetermined reference value to determine the concentration of methyl salicylate may also be performed.

Some embodiments of the present invention relate to a method for sensing methyl salicylate, utilizing a phenomenon in which methyl salicylate reacts with a boron-oxygen compound having a structure represented by general formula (1), a diboroxane derivative represented by general formula (2), a phenylboronic acid derivative represented by general formula (3), or a boroxine derivative represented by general formula (4) to form a boron complex, resulting in fluorescence emission.

<Electrochemical Behavior>

The complex produced by the reaction of the compound having a specific structure that comprises a boron-oxygen bond and methyl salicylate exhibits electrochemical behavior that is different from that of the receptor, the compound having a specific structure that comprises a boron-oxygen bond. Specifically, a large change in current value occurs as measured for cyclic voltammetry of an electrochemical cell containing the complex formed by the compound having a specific structure that comprises a boron-oxygen bond and methyl salicylate. This makes it possible to detect methyl salicylate by monitoring this current value.

Thus, some embodiments of the present invention relate to a method for detecting methyl salicylate, comprising: (i) a step of allowing a boron-oxygen compound having a structure represented by general formula (1), a diboroxane derivative represented by general formula (2), a phenylboronic acid derivative represented by general formula (3), or a boroxine derivative represented by general formula (4) to react with methyl salicylate in a solution to form a complex; (ii) a step of measuring a current flowing through the solution under a certain voltage; and (iii) a step of detecting a change in current value caused by formation of the complex. In some embodiments, an appropriate value in the range of 1.6 to 2.2 V is selected as a value of the voltage. The solution may contain tetrabutylammonium tetrafluoroborate as a supporting electrolyte, for example, but the supporting electrolyte is not limited to this. In some embodiments, a step of comparing the detected change in current value with a predetermined reference value to determine the concentration of methyl salicylate may also be performed.

Some embodiments of the present invention relate to a method for sensing methyl salicylate, characterized by utilizing a phenomenon in which methyl salicylate reacts with a boron-oxygen compound having a structure represented by general formula (1), a diboroxane derivative represented by general formula (2), a phenylboronic acid derivative represented by general formula (3), or a boroxine derivative represented by general formula (4), and thereby changing electrochemical behavior.

Some embodiments of the present invention relate to a method for sensing methyl salicylate, characterized by utilizing a change in current value caused by a reaction of methyl salicylate and a boron-oxygen compound having a structure represented by general formula (1), a diboroxane derivative represented by general formula (2), a phenylboronic acid derivative represented by general formula (3), or a boroxine derivative represented by general formula (4).

In some embodiments, the method for sensing methyl salicylate of the present invention may be used for detecting pathogen infection in a crop.

<Methyl Salicylate Sensor>

A methyl salicylate sensor of the present invention using a compound having a specific structure that comprises a boron-oxygen bond as a receptor comprises at least a recognition section for methyl salicylate and a detection section that detects recognition of methyl salicylate by the recognition section. The recognition section at least comprises a compound having a specific structure that comprises a boron-oxygen bond, which is a receptor. The compound having a specific structure that comprises a boron-oxygen bond does not react with or recognize other plant hormones other than methyl salicylate, such as methyl jasmonate, and can therefore selectively recognize methyl salicylate. The detection section is configured to be able to optically and/or electrochemically detect recognition of methyl salicylate by the recognition section for methyl salicylate. For example, the optical detection section comprises at least an excitation light source and a detection element in order to detect fluorescence emission of a complex produced by the compound having a specific structure that comprises a boron-oxygen bond and methyl salicylate, and detects methyl salicylate and measures the concentration thereof based on a change in fluorescence intensity. The electrochemical detection section constitutes an electrochemical cell (detection element) with an electrode to detect a current caused by oxidation of a complex produced by the compound having a specific structure that comprises a boron-oxygen bond and methyl salicylate, in order to detect a change in electrochemical behavior, for example, and detects methyl salicylate and measures the concentration thereof using a change in electrochemical behavior of the electrochemical cell (for example, change in current value at a certain potential).

Thus, some embodiments of the present invention relate to a methyl salicylate sensor for detecting methyl salicylate, at least comprising: a recognition section for methyl salicylate that comprises a boron-oxygen compound having a specific structure represented by general formula (1), which is a receptor that selectively recognizes methyl salicylate; and a detection section that detects recognition of methyl salicylate by the recognition section. In some embodiments, the methyl salicylate sensor of the present invention detects methyl salicylate, which is a plant hormone released when a crop is infected by a pathogen. Thus, the methyl salicylate sensor of the present invention may be used as a sensor for detecting pathogen infection in a crop. In some embodiments, the methyl salicylate sensor of the present invention can selectively detect methyl salicylate compared to methyl jasmonate.

Some embodiments of the present invention relate to a methyl salicylate sensor for detecting methyl salicylate, at least comprising: (i) a recognition section for methyl salicylate that comprises a boron-oxygen compound having a structure represented by general formula (1); and (ii) a detection section that optically detects recognition of methyl salicylate by the recognition section. In some embodiments, the optical detection section at least comprises an excitation light source and a detection element. In some embodiments, the methyl salicylate sensor of the present invention can detect methyl salicylate and/or measure the concentration thereof based on a change in the observed fluorescence intensity.

Some embodiments of the present invention relate to a methyl salicylate sensor for detecting methyl salicylate, at least comprising: (i) a recognition section for methyl salicylate that comprises a boron-oxygen compound having a structure represented by general formula (1); and (ii) a detection section that electrochemically detects recognition of methyl salicylate by the recognition section. In some embodiments, the electrochemical detection section comprises an electrochemical cell having an electrode that detects a current caused by oxidation of a complex formed by the boron-oxygen compound and methyl salicylate. In some embodiments, the methyl salicylate sensor of the present invention can detect methyl salicylate and/or measure the concentration thereof based on a change in current value of the electrochemical cell.

In some embodiments, the detection section may comprise a computer that executes a program to process detection of methyl salicylate and/or measurement of the concentration thereof. Such a program may be, for example, a program that causes the computer to execute a step of receiving a signal from the optical and/or electrochemical detection element, a step of analyzing the received signal to determine the presence or absence of methyl salicylate and/or the concentration thereof, and a step of outputting the analysis result. In some embodiments, the analysis of the received signal may include comparing the received signal with a predetermined reference value to determine the presence or absence of methyl salicylate and/or the concentration thereof, for example. In some embodiments, the analysis result may be output to, for example, a display device connected to the sensor, or other equipment or the like connected via a network.

Thus, some embodiments of the present invention relate to a program in a methyl salicylate sensor for detecting methyl salicylate, the methyl salicylate sensor at least comprising: a recognition section for methyl salicylate that comprises a boron-oxygen compound having a specific structure represented by general formula (1), which is a receptor that selectively recognizes methyl salicylate; and a detection section that detects recognition of methyl salicylate by the recognition section, the detection section comprising a detection element and a computer, wherein the program causes the computer to execute: (i) a step of receiving a signal from the optical and/or electrochemical detection element; (ii) a step of analyzing the received signal to determine the presence or absence of methyl salicylate and/or the concentration thereof; and (iii) a step of outputting the analysis result.

<Method for Early Detection of Pathogen Infection in Crop>

As one application of the methyl salicylate sensor of the present invention, by installing the methyl salicylate sensor near where a crop is planted and detecting methyl salicylate by the sensor, it is possible to detect pathogen infection in the crop at an early stage.

Thus, some embodiments of the present invention relate to a method for detecting pathogen infection in a crop, comprising installing a methyl salicylate sensor in the vicinity of the crop, and detecting methyl salicylate by the sensor. In some embodiments, the methyl salicylate sensor is a methyl salicylate sensor at least comprising: a recognition section for methyl salicylate that comprises a boron-oxygen compound having a specific structure represented by general formula (1), which is a receptor that selectively recognizes methyl salicylate; and a detection section that detects recognition of methyl salicylate by the recognition section. In some embodiments, the methyl salicylate sensor is a methyl salicylate sensor at least comprising: (i) a recognition section for methyl salicylate that comprises a boron-oxygen compound having a structure represented by general formula (1); and (ii) a detection section that optically and/or electrochemically detects recognition of methyl salicylate by the recognition section.

Examples of the crop that may be the monitoring target include, but are not limited to, cucumber, watermelon, tomato, eggplant, green pepper, shishito pepper, melon, Chinese cabbage, cabbage, radish, lettuce, leek, broccoli, onion, garlic, Japanese yam, asparagus, carrot, potato, celery, tobacco, rice, and strawberry. Examples of the disease that may be detected include, but are not limited to, ring spot disease, leaf spot, Corynespora target spot, leaf mold, fusarium wilt, root rot wilt, Verticillium wilt, brown root rot, gray phytophthora rot, root rot, black dot root rot, southern blight, damping off, brown leaf spot, downy mildew, powdery mildew, gray mold, anthracnose, scab, Sclerotinia rot, gummy stem blight, leaf spot, blight, mosaic disease, spotted wilt, yellow leaf curl, bacterial wilt, bacterial soft rot, bacterial canker, pith necrosis, bacterial black spot, and bacterial leaf spot, and examples of the pathogen infection that may be detected include, but are not limited to, infections caused by the causative microorganisms of the above diseases.

In the context of the present disclosure, when referring to installing the sensor in the vicinity of the crop, examples of the term "vicinity" include, but are not limited to, a distance within 2 m, within 1 m, within 75 cm, within 50 cm, within 40 cm, within 30 cm, within 20 cm, within 10 cm, or within 5 cm of the crop to be monitored, and an appropriate distance is selected as appropriate in consideration of a variety of factors. A person skilled in the art would be able to set the position of the sensor to be installed as appropriate in consideration of a variety of conditions.

Some embodiments of the present invention relate to the use of a methyl salicylate sensor in detection of pathogen infection in a crop. Some embodiments of the present invention relate to use of a boron-oxygen compound having a structure represented by general formula (1), a diboroxane derivative represented by general formula (2), a phenylboronic acid derivative represented by general formula (3), or a boroxine derivative represented by general formula (4) in production of a methyl salicylate sensor.

EXAMPLES

Hereinafter, an embodiment of the present invention will be explained in details by using examples, but the present invention is not limited to these examples.

Example 1

Figure 1:
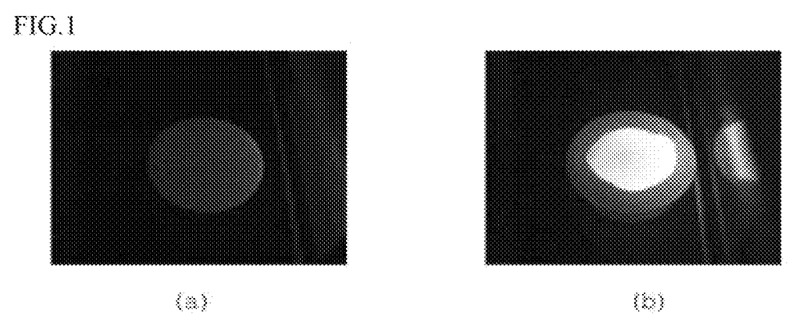

0.2 ml of a solution obtained by dissolving 0.1 g of tetraacetoxy diboroxane (TBO) in 3 ml of acetonitrile was dropped on a circular filter paper (45 mmΦ) and dried to obtain a filter paper containing TBO. The obtained filter paper was excited with a UV lamp (wavelength 365 nm) to confirm whether fluorescence emission was present (FIG. 1(a)). Next, 0.03 ml of an acetonitrile solution (0.1 mol/L) of methyl salicylate (MSA), which is released when a plant is infected by a pathogen, was dropped on that filter paper and dried, and the obtained filter paper was similarly excited with a UV lamp to confirm whether fluorescence emission was present (FIG. 1(b)). As a result, it was found that TBO reacts with methyl salicylate and exhibits fluorescence emission, indicating that methyl salicylate can be sensed.

Comparative Example 1

Figure 2:
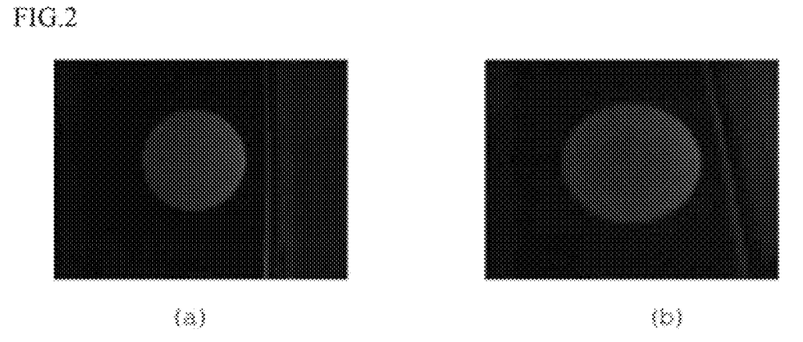

0.2 ml of a solution obtained by dissolving 0.1 g of tetraacetoxy diboroxane (TBO) in 3 ml of acetonitrile was dropped on a circular filter paper (45 mmΦ) and dried to obtain a filter paper containing TBO. The obtained filter paper was excited with a UV lamp (wavelength 365 nm) to confirm whether fluorescence emission was present (FIG. 2(a)). Next, 0.03 ml of an acetonitrile solution (0.1 mol/L) of methyl jasmonate, which is a signal substance released when a plant undergoes damage by an insect pest, was dropped on that filter paper and dried, and the obtained filter paper was similarly excited with a UV lamp to confirm whether fluorescence emission was present (FIG. 2(b)). As a result, it was found that TBO does not react with methyl jasmonate and not exhibit fluorescence emission.

From the results of Example 1 and Comparative Example 1, it was found that TBO can selectively sense methyl salicylate, which is released by a plant at the time of pathogen infection.

Example 2

Figure 3:
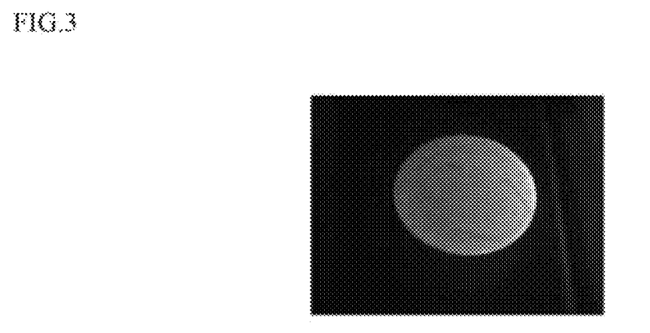
FIG. 3 is a photograph showing the results of evaluating whether fluorescence emission is observed when leaving a filter paper containing TBO and methyl salicylate placed in a Petri dish at rest in a desiccator so that they are not in direct contact, taking out the filter paper after 1 hour, and exciting the filter paper with a UV lamp.

0.2 ml of a solution obtained by dissolving 0.1 g of tetraacetoxy diboroxane (TBO) in 3 ml of acetonitrile was dropped on a circular filter paper (45 mmΦ) and dried to obtain a filter paper containing TBO. Next, this filter paper and 0.05 g of methyl salicylate placed in a Petri dish were left at rest and stored in a desiccator so that they are not in direct contact. After 1 hour, the filter paper was taken out, and the filter paper was excited with a UV lamp (wavelength 365 nm) to evaluate whether fluorescence emission was present, which confirmed blue fluorescence (FIG. 3). From this result, it was found that methyl salicylate, which is released by a plant at the time of pathogen infection, can be sensed as a volatile signal.

Example 3

Figure 4:
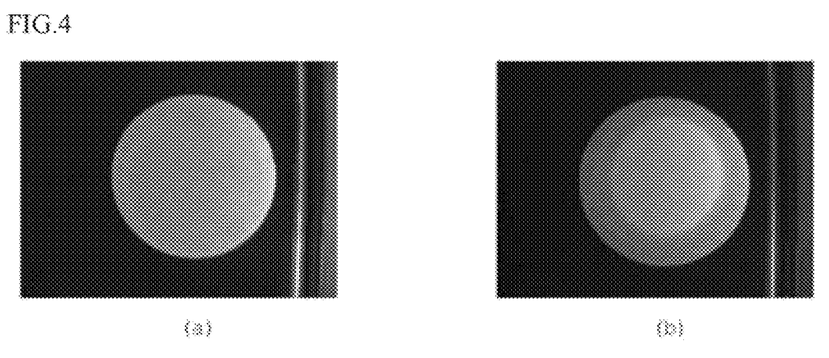

0.2 ml of a solution obtained by dissolving 0.1 g of phenylboronic acid (PB) in 3 ml of methanol was dropped on a circular filter paper (45 mmΦ) and dried to obtain a filter paper containing PB. The obtained filter paper was excited with a UV lamp (wavelength 365 nm) to confirm whether fluorescence emission was present (FIG. 4(a)). Next, 0.03 ml of an acetonitrile solution (0.1 mol/L) of methyl salicylate (MSA), which is released when a plant is infected by a pathogen, was dropped on that filter paper and dried, and the obtained filter paper was similarly excited with a UV lamp to confirm whether fluorescence emission was present (FIG. 4(b)). As a result, it was found that PB reacts with methyl salicylate and exhibits fluorescence emission, indicating that methyl salicylate can be sensed.

Comparative Example 2

Figure 5:
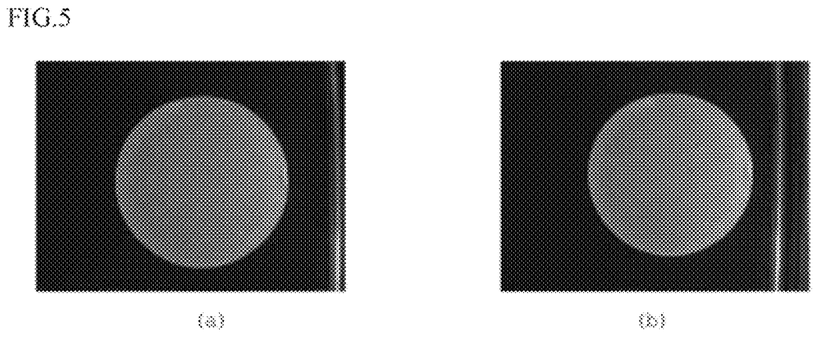

0.2 ml of a solution obtained by dissolving 0.1 g of phenylboronic acid (PB) in 3 ml of acetonitrile was dropped on a circular filter paper (45 mmΦ) and dried to obtain a filter paper containing PB. The obtained filter paper was excited with a UV lamp (wavelength 365 nm) to confirm whether fluorescence emission was present (FIG. 5(a)). Next, 0.03 ml of an acetonitrile solution (0.1 mol/L) of methyl jasmonate, which is a signal substance released when a plant undergoes damage by an insect pest, was dropped on that filter paper and dried, and the obtained filter paper was similarly excited with a UV lamp to confirm whether fluorescence emission was present (FIG. 5(b)). As a result, it was found that PB does not react with methyl jasmonate and not exhibit fluorescence emission.

From the results of Example 3 and Comparative Example 2, it was found that PB can selectively sense methyl salicylate, which is released by a plant at the time of pathogen infection.

Example 4

Figure 6:
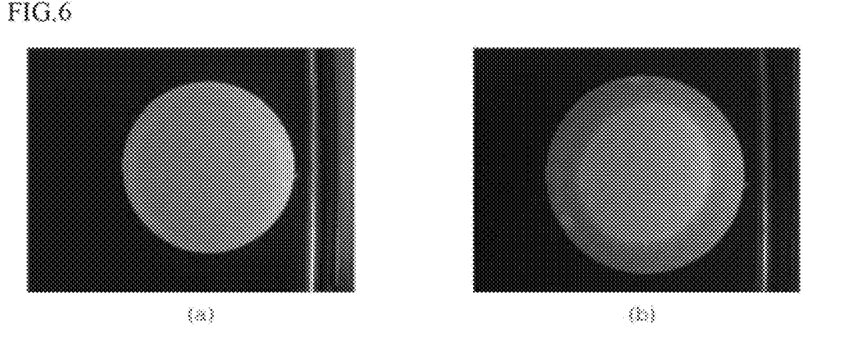

0.2 ml of a solution obtained by dissolving 0.1 g of 2,4,6-triphenylboroxine acid (TPB) in 3 ml of methanol was dropped on a circular filter paper (45 mmΦ) and dried to obtain a filter paper containing PB. The obtained filter paper was excited with a UV lamp (wavelength 365 nm) to confirm whether fluorescence emission was present (FIG. 6(a)). Next, 0.03 ml of an acetonitrile solution (0.1 mol/L) of methyl salicylate (MSA), which is released when a plant is infected by a pathogen, was dropped on that filter paper and dried, and the obtained filter paper was similarly excited with a UV lamp to confirm whether fluorescence emission was present (FIG. 6(b)). As a result, it was found that TPB reacts with methyl salicylate and exhibits fluorescence emission, indicating that methyl salicylate can be sensed.

Comparative Example 3

Figure 7:
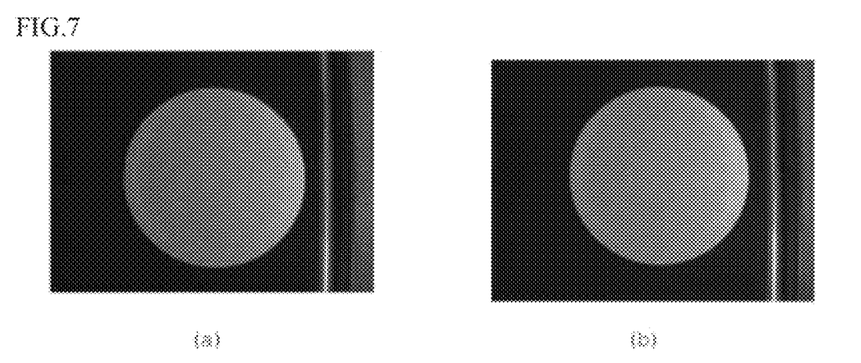

0.2 ml of a solution obtained by dissolving 0.1 g of 2,4,6-triphenylboroxine acid (TPB) in 3 ml of acetonitrile was dropped on a circular filter paper (45 mmΦ) and dried to obtain a filter paper containing TPB. The obtained filter paper was excited with a UV lamp (wavelength 365 nm) to confirm whether fluorescence emission was present (FIG. 7(a)). Next, 0.03 ml of an acetonitrile solution (0.1 mol/L) of methyl jasmonate, which is a signal substance released when a plant undergoes damage by an insect pest, was dropped on that filter paper and dried, and the obtained filter paper was similarly excited with a UV lamp to confirm whether fluorescence emission was present (FIG. 7(b)). As a result, it was found that TPB does not react with methyl jasmonate and not exhibit fluorescence emission.

From the results of Example 4 and Comparative Example 3, it was found that TPB can selectively sense methyl salicylate, which is released by a plant at the time of pathogen infection.

Example 5

Figure 8:
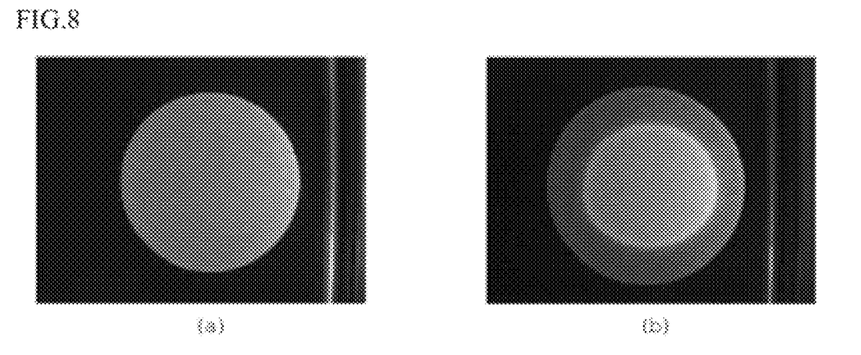

0.2 ml of a solution obtained by dissolving 0.1 g of 2,4,6-tris(3,4,5-trifluorophenyl)boroxine (TFPB) in 3 ml of methanol was dropped on a circular filter paper (45 mmΦ) and dried to obtain a filter paper containing TFPB. The obtained filter paper was excited with a UV lamp (wavelength 365 nm) to confirm whether fluorescence emission was present (FIG. 8(a)). Next, 0.03 ml of an acetonitrile solution (0.1 mol/L) of methyl salicylate (MSA), which is released when a plant is infected by a pathogen, was dropped on that filter paper and dried, and the obtained filter paper was similarly excited with a UV lamp to confirm whether fluorescence emission was present (FIG. 8(b)). As a result, it was found that TFPB reacts with methyl salicylate and exhibits fluorescence emission, indicating that methyl salicylate can be sensed.

Comparative Example 4

Figure 9:
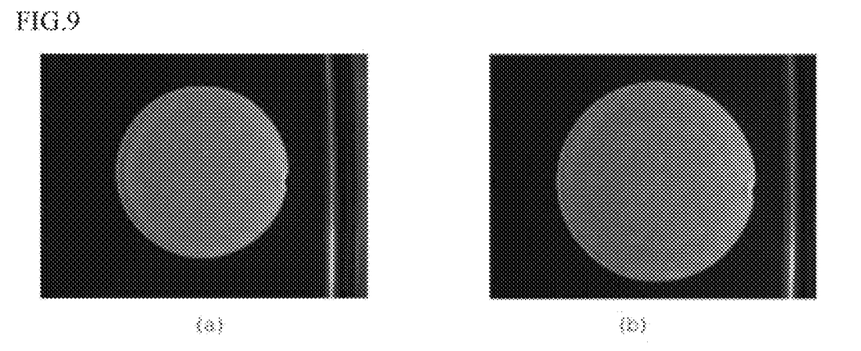

0.2 ml of a solution obtained by dissolving 0.1 g of 2,4,6-tris(3,4,5-trifluorophenyl)boroxine (TFPB) in 3 ml of acetonitrile was dropped on a circular filter paper (45 mmΦ) and dried to obtain a filter paper containing TFPB. The obtained filter paper was excited with a UV lamp (wavelength 365 nm) to confirm whether fluorescence emission was present (FIG. 9(a)). Next, 0.03 ml of an acetonitrile solution (0.1 mol/L) of methyl jasmonate, which is a signal substance released when a plant undergoes damage by an insect pest, was dropped on that filter paper and dried, and the obtained filter paper was similarly excited with a UV lamp to confirm whether fluorescence emission was present (FIG. 9(b)). As a result, it was found that TPB does not react with methyl jasmonate and not exhibit fluorescence emission.

From the results of Example 5 and Comparative Example 4, it was found that TFPB can selectively sense methyl salicylate, which is released by a plant at the time of pathogen infection.

Example 6

[Quantitative Evaluation of Fluorescence Intensity]

Figure 10:
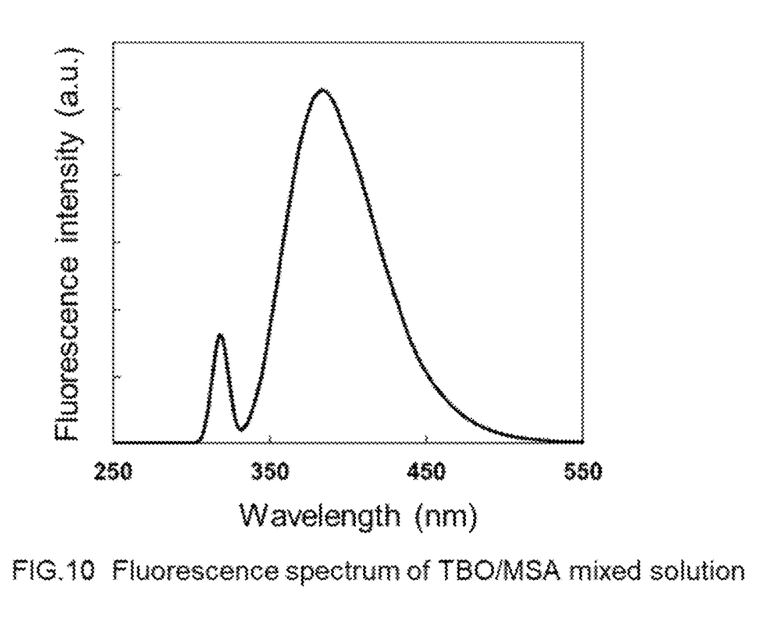
FIG. 10 shows a fluorescence spectrum curve obtained by mixing 1 ml of a solution of TBO in acetonitrile (concentration 0.1 mol/L) with 1 ml of a solution of MSA in acetonitrile (concentration 0.1 mol/L), diluting it 2000 times after 10 minutes, placing the solution in a quartz cell, and measuring its fluorescence spectrum at an excitation wavelength of 348 nm.

1 ml of a solution of TBO in acetonitrile (concentration 0.1 mol/L) and 1 ml of a solution of MSA in acetonitrile (concentration 0.1 mol/L) were added and diluted by 2000 times after 10 minutes, the solution was placed in a quartz cell, and its fluorescence spectrum was measured at an excitation wavelength of 348 nm, and consequently, a fluorescence spectrum curve shown in FIG. 10 was obtained.

Figure 11:
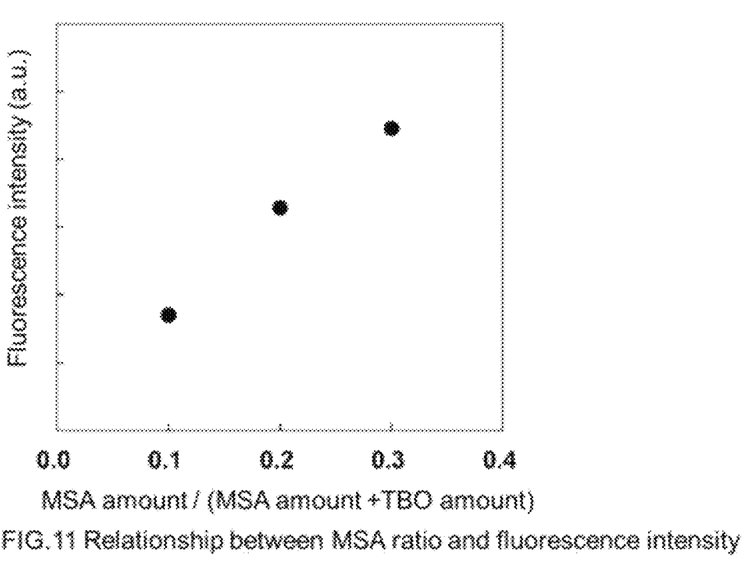
FIG. 11 is a diagram on which fluorescence intensities are plotted that are obtained by preparing mixed solutions with different ratios of TBO and MSA, measuring the fluorescence spectra at an excitation wavelength of 348 nm, and then determining the fluorescence intensities at a wavelength of 384 nm.

The peak wavelength at that time was 384 nm. Next, 0.9 ml of a solution of TBO in acetonitrile (concentration 0.1 mol/L) and 0.1 ml of a solution of MSA in acetonitrile (concentration 0.1 mol/L) were added and diluted by 2000 times after 10 minutes, the fluorescence spectrum was measured at an excitation wavelength of 348 nm, and the fluorescence intensity at a wavelength of 384 nm was determined. In the same manner, the fluorescence intensity with 0.8 ml of the TBO solution and 0.2 ml of the MSA solution, as well as the fluorescence intensity with 0.7 ml of the TBO solution and 0.3 ml of the MSA solution, was determined. FIG. 11 shows a plot of the obtained fluorescence intensities. From the results, it was found that, as the ratio of MSA is increased, the fluorescence intensity is also increased, indicating that MSA can be quantitatively detected.

Example 7

[Measurement of Electrochemical Behavior]

An electrolyte solution was prepared by dissolving tetrabutylammonium tetrafluoroborate as a supporting electrolyte in acetonitrile (concentration: 0.1 mol/L), 10 ml of the electrolyte solution was placed in a glass container, and an electrochemical cell having three electrodes, consisting of a working electrode, a counter electrode, and a reference electrode, was constituted. Note that glassy carbon was used as the working electrode, Pt as the counter electrode, and Ag/Ag$^+$ electrode as the reference electrode. To this, 0.1 ml of a solution of TBO in acetonitrile (concentration: 0.1 mol/L) was added, and the cyclic voltammetry (CV) was measured at room temperature (sweep potential: 0 to 2.2 V, sweep rate: 0.1 V/s).

Next, 0.1 ml of an acetonitrile solution (concentration: 0.1 mol/L) of methyl salicylate (MSA) was added to it, and the CV measurement was carried out in the same manner.

Figure 12:
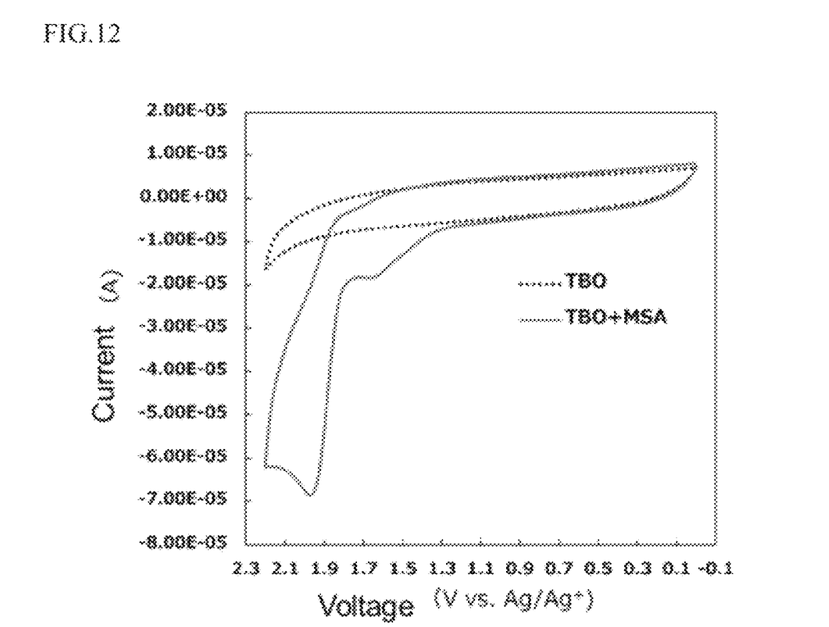
FIG. 12 shows the measurement results of cyclic voltammetry (CV) of a solution of TBO in acetonitrile (dashed line) and of a solution of TBO+MSA in acetonitrile (solid line).

The obtained current-voltage curve (cyclic voltammogram) is shown in FIG. 12. The dashed line shows the measurement result of TBO alone, and the solid line shows the result after adding MSA to TBO. From these results, it was found that, after the addition of MSA, the current value is greatly changed in the region of a potential of 1.6 to 2.2 V compared to that before the addition. This indicates that methyl salicylate, a plant hormone, can be sensed through a change in current value, for example, by monitoring the current value flowing through the electrode at a voltage (1.6 to 2.2 V for Ag/Ag$^+$ electrode) where the current value is greatly changed before and after the addition of MSA.

Comparative Example 5

[Measurement of Electrochemical Behavior]

Figure 13:
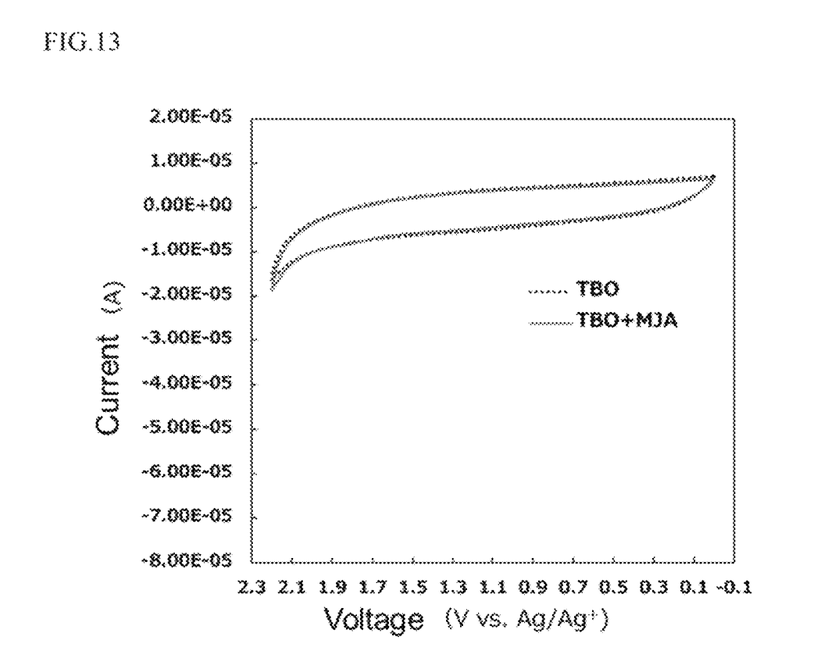
FIG. 13 shows the measurement results of cyclic voltammetry (CV) of a solution of TBO in acetonitrile (dashed line) and of a solution of TBO+methyl jasmonate (MJA) in acetonitrile (solid line).

The measurement of cyclic voltammetry was carried out in the same manner as in Example 7 except that, instead of using an acetonitrile solution of methyl salicylate, 0.1 ml of an acetonitrile solution (concentration: 0.1 mol/L) of methyl jasmonate (MJA), which is a plant hormone released when a plant is damaged by an insect pest, was added. The obtained results are shown in FIG. 13. The dashed line shows the measurement result of TBO alone, and the solid line shows the result after adding MJA to TBO. From these results, it was found that there is no voltage region where the current value is greatly changed before and after the addition of MJA.

From Example 7 and Comparative Example 5, it was revealed that methyl salicylate can be selectively sensed by TBO, also in an electrochemical manner.

The whole or part of the example embodiments disclosed above can be described as, but not limited to, the following supplementary notes.

(Supplementary Note 1)

A sensing method for sensing methyl salicylate, using a boron-oxygen compound having a structure represented by the following general formula (1) as a receptor that selectively recognizes methyl salicylate:

(1)

(Supplementary Note 2)

The sensing method according to Supplementary note 1, wherein the boron-oxygen compound is a diboroxane derivative represented by the following general formula (2):

(2)

wherein R represents methyl group, ethyl group, propyl group, butyl group, or phenyl group, and each R may be the same as or different from each other.

(Supplementary Note 3)

The sensing method according to Supplementary note 1, wherein the boron-oxygen compound is a phenylboronic acid derivative represented by the following general formula (3):

(3)

wherein X represents hydrogen atom, alkyl group, alkoxy group, mercapto group, mercapto-substituted alkyl group, or mercapto-substituted alkoxy group, each having 1 to 4 carbon atoms, n represents an integer of 1 to 5, and when n is 2 or more, each X may be the same as or different from each other.

(Supplementary Note 4)

The sensing method according to Supplementary note 1, wherein the boron-oxygen compound is a boroxine derivative represented by the following general formula (4):

(4)

wherein Z represents alkyl group having 1 to 4 carbon atoms, or substituted or unsubstituted phenyl group, and each Z may be the same as or different from each other.
(Supplementary Note 5)

The sensing method according to any one of Supplementary notes 1 to 4, wherein the sensing utilizes a phenomenon in which methyl salicylate reacts with the boron-oxygen compound to form a boron complex and exhibit fluorescence emission.
(Supplementary Note 6)

The sensing method according to any one of Supplementary notes 1 to 4, wherein the sensing utilizes a phenomenon in which electrochemical behavior is changed by a reaction of the boron-oxygen compound and methyl salicylate.
(Supplementary Note 7)

The sensing method according to Supplementary note 6, wherein the sensing utilizes a change in current value caused by a reaction of the boron-oxygen compound and methyl salicylate.
(Supplementary Note 8)

A methyl salicylate sensor for detecting methyl salicylate, at least comprising:
  i) a recognition section for methyl salicylate that comprises a boron-oxygen compound having a structure represented by general formula (1); and
  ii) a detection section that detects recognition of methyl salicylate by the recognition section.
(Supplementary Note 9)

A method for detecting pathogen infection in a crop, comprising installing the methyl salicylate sensor according to Supplementary note 8 in a vicinity of the crop, and detecting methyl salicylate by the sensor.
(Supplementary Note 10)

A methyl salicylate sensor for detecting methyl salicylate, at least comprising: a recognition section for methyl salicylate that comprises a boron-oxygen compound having a specific structure represented by general formula (1), which is a receptor that selectively recognizes methyl salicylate; and a detection section that detects recognition of methyl salicylate by the recognition section, the detection section comprising an optical and/or electrochemical detection element and a computer, wherein the methyl salicylate sensor has a program that causes the computer to execute:
  i) a step of receiving a signal from the optical and/or electrochemical detection element;
  ii) a step of analyzing the received signal to determine presence or absence of methyl salicylate and/or a concentration thereof; and
  iii) a step of outputting an analysis result.
(Supplementary Note 11)

A detection method for detecting methyl salicylate, comprising: (i) a step of allowing a boron-oxygen compound having a structure represented by general formula (1), a diboroxane derivative represented by general formula (2), a phenylboronic acid derivative represented by general formula (3), or a boroxine derivative represented by general formula (4) to react with methyl salicylate to form a complex; (ii) a step of exposing the complex to excitation light; and (iii) a step of detecting fluorescence emitted by the complex.
(Supplementary Note 12)

The detection method according to Supplementary note 11, wherein a wavelength in a range of 200 to 400 nm is used as the excitation wavelength.
(Supplementary Note 13)

The detection method according to Supplementary note 11 or 12, further comprising a step of comparing an intensity of the detected fluorescence with a predetermined reference value to determine a concentration of methyl salicylate.
(Supplementary Note 14)

A detection method for detecting methyl salicylate, comprising: (i) a step of allowing a boron-oxygen compound having a structure represented by general formula (1), a diboroxane derivative represented by general formula (2), a phenylboronic acid derivative represented by general formula (3), or a boroxine derivative represented by general formula (4) to react with methyl salicylate in a solution to form a complex; (ii) a step of measuring a current flowing through the solution under a certain voltage; and (iii) a step of detecting a change in current value caused by formation of the complex.
(Supplementary Note 15)

The detection method according to Supplementary note 14, wherein a value of the voltage is in a range of 1.6 to 2.2 V.
(Supplementary Note 16)

The detection method according to Supplementary note 14 or 15, wherein the solution comprises tetrabutylammonium tetrafluoroborate as a supporting electrolyte.
(Supplementary Note 17)

The detection method according to any one of Supplementary notes 14 to 16, further comprising a step of comparing the detected change in current value with a predetermined reference value to determine a concentration of methyl salicylate.
(Supplementary Note 18)

The detection method according to any one of Supplementary notes 10 to 17, wherein the boron-oxygen compound having a structure represented by general formula (1) is selected from the group consisting of tetraacetoxy diboroxane (TBO), phenylboronic acid (PB), 2,4,6-triphenylboroxine acid (TPB), and 2,4,6-tris(3,4,5-trifluorophenyl)boroxine (TFPB).
(Supplementary Note 19)

A methyl salicylate sensor for detecting methyl salicylate, at least comprising: (i) a recognition section for methyl salicylate that comprises a boron-oxygen compound having a structure represented by general formula (1); and (ii) a detection section that optically detects recognition of methyl salicylate by the recognition section.
(Supplementary Note 20)

The methyl salicylate sensor according to Supplementary note 19, wherein the optical detection section at least comprises an excitation light source and a detection element.
(Supplementary Note 21)

A methyl salicylate sensor for detecting methyl salicylate, at least comprising: (i) a recognition section for methyl salicylate that comprises a boron-oxygen compound having a structure represented by general formula (1); and (ii) a detection section that electrochemically detects recognition of methyl salicylate by the recognition section.
(Supplementary Note 22)

The methyl salicylate sensor according to Supplementary note 21, wherein the electrochemical detection section comprises an electrochemical cell having an electrode that detects a current caused by oxidation of a complex formed by the boron-oxygen compound and methyl salicylate.
(Supplementary Note 23)

A method for detecting pathogen infection in a crop, comprising installing a methyl salicylate sensor in a vicinity of the crop, and detecting methyl salicylate by the sensor.

(Supplementary Note 24)

The method for detecting pathogen infection in a crop according to Supplementary note 9 or 23, wherein the sensor is installed within 2 m from the crop.

(Supplementary Note 25)

A program in a methyl salicylate sensor for detecting methyl salicylate, the methyl salicylate sensor at least comprising: a recognition section for methyl salicylate that comprises a boron-oxygen compound having a specific structure represented by general formula (1), which is a receptor that selectively recognizes methyl salicylate; and a detection section that detects recognition of methyl salicylate by the recognition section, the detection section comprising an optical and/or electrochemical detection element and a computer, wherein the program causes the computer to execute:

i) a step of receiving a signal from the optical and/or electrochemical detection element;

ii) a step of analyzing the received signal to determine presence or absence of methyl salicylate and/or a concentration thereof; and iii) a step of outputting an analysis result.

This application is based upon and claims the benefit of priority from Japanese patent application No. 2020-010620, filed on Jan. 27, 2020, the disclosure of which is incorporated herein in its entirety by reference.

While the invention has been described with reference to example embodiments and examples thereof, the invention is not limited to these embodiments and examples. Various changes that can be understood by those of ordinary skill in the art may be made to forms and details of the present invention without departing from the spirit and scope of the present invention.

INDUSTRIAL APPLICABILITY

The sensing according to embodiments of the present invention in which a compound having a specific structure that comprises a boron-oxygen bond is used as a receptor for detecting methyl salicylate, which is a plant hormone, selectively forms a complex with methyl salicylate and also develops a fluorescence emission phenomenon and a change in electrochemical behavior, and thus enables selective detection of methyl salicylate, which is a plant hormone released when a plant is infected by a pathogen.

By using a sensor in which the compound having a specific structure that comprises a boron-oxygen bond serves as the recognition section, disease infection in a plant can be detected at an early stage, and specifically, as a sensor that can detect disease infection of a crop at an early stage, it can be used as a novel sensor for agricultural ICT in greenhouses and other horticultural facilities.

What is claimed is:

1. A sensing method for sensing methyl salicylate, using a boron-oxygen compound having a structure represented by the following general formula (1) as a receptor that selectively recognizes methyl salicylate:

(1)

, wherein the boron-oxygen compound comprises a diboroxane derivative represented by the following general formula (2), a phenylboronic acid derivative represented by the following general formula (3), or a boroxine derivative represented by the following general formula (4), (2)

wherein R represents methyl group, ethyl group, propyl group, butyl group, or phenyl group, and each R may be the same as or different from each other, (3)

wherein X represents hydrogen atom, mercapto group, alkyl group, alkoxy group, mercapto-substituted alkyl group, or mercapto-substituted alkoxy group, each having 1 to 4 carbon atoms, n represents an integer of 1 to 5, and when n is 2 or more, each X may be the same as or different from each other, (4)

wherein Z represents alkyl group having 1 to 4 carbon atoms, or substituted or unsubstituted phenyl group, and each Z may be the same as or different from each other.

2. The sensing method according to claim 1, wherein the sensing method utilizes a phenomenon in which methyl salicylate reacts with the boron-oxygen compound to form a boron complex and exhibit fluorescence emission.

3. The sensing method according to claim 1, wherein the sensing method utilizes a phenomenon in which electrochemical behavior is changed by a reaction of the boron-oxygen compound and methyl salicylate.

4. The sensing method according to claim 3, wherein the sensing method utilizes a change in current value caused by a reaction of the boron-oxygen compound and methyl salicylate.

5. The sensing method according to claim 1, wherein the boron-oxygen compound is at least one selected from the group consisting of tetraacetoxy diboroxane (TBO), phenylboronic acid (PB), 2,4,6-triphenylboroxine acid (TPB), and 2,4,6-tris(3,4,5-trifluorophenyl)boroxine (TFPB).

6. A methyl salicylate sensor for detecting methyl salicylate, at least comprising:

i) a recognition section for methyl salicylate that comprises a boron-oxygen compound having a structure represented by general formula (1); and ii) a detection section that detects recognition of methyl salicylate by the recognition section (1)

wherein the boron-oxygen compound comprises a diboroxane derivative represented by general formula (2), a phenylboronic acid derivative represented by general formula (3), or a boroxine derivative represented by general formula (4);

(2)

wherein R represents methyl group, ethyl group, propyl group, butyl group, or phenyl group, and each R may be the same as or different from each other;

(3)

wherein X represents hydrogen atom, mercapto group, alkyl group, alkoxy group, mercapto-substituted alkyl group, or mercapto-substituted alkoxy group, each having 1 to 4 carbon atoms, n represents an integer of 1 to 5, and when n is 2 or more, each X may be the same as or different from each other;

wherein Z represents alkyl group having 1 to 4 carbon atoms, or substituted or unsubstituted phenyl group, and each Z may be the same as or different from each other.

7. A method for detecting pathogen infection in a crop, comprising installing the methyl salicylate sensor according to claim 6 in a vicinity of the crop, and detecting methyl salicylate by the sensor.

8. The method for detecting pathogen infection in a crop according to claim 7, wherein the sensor is installed within 2 m from the crop.

9. The method for detecting pathogen infection in a crop according to claim 7, wherein the boron-oxygen compound is at least one selected from the group consisting of tetraacetoxy diboroxane (TBO), phenylboronic acid (PB), 2,4,6-triphenylboroxine acid (TPB), and 2,4,6-tris(3,4,5-trifluorophenyl)boroxine (TFPB).

10. The methyl salicylate sensor for detecting methyl salicylate according to claim 6, the detection section comprising an optical and/or electrochemical detection element and a computer, wherein the methyl salicylate sensor has a program that causes the computer to execute:
i) a step of receiving a signal from the optical and/or electrochemical detection element;
ii) a step of analyzing the received signal to determine presence or absence of methyl salicylate and/or a concentration thereof; and
iii) a step of outputting an analysis result.

11. The methyl salicylate sensor for detecting methyl salicylate according to claim 6, wherein the detection section comprises an optical detection section that optically detects recognition of methyl salicylate by the recognition section.

12. The methyl salicylate sensor according to claim 11, wherein the optical detection section at least comprises an excitation light source and a detection element.

13. The methyl salicylate sensor for detecting methyl salicylate according to claim 6, the detection section comprises an electrochemical detection section that electrochemically detects recognition of methyl salicylate by the recognition section.

14. The methyl salicylate sensor according to claim 13, wherein the electrochemical detection section comprises an electrochemical cell having an electrode that detects a current caused by oxidation of a complex formed by the boron-oxygen compound and methyl salicylate.

15. The methyl salicylate sensor according to claim 6, wherein the boron-oxygen compound is at least one selected from the group consisting of tetraacetoxy diboroxane (TBO), phenylboronic acid (PB), 2,4,6-triphenylboroxine acid (TPB), and 2,4,6-tris(3,4,5-trifluorophenyl)boroxine (TFPB).

* * * * *